(12) United States Patent
Constantin et al.

(10) Patent No.: US 12,033,195 B1
(45) Date of Patent: Jul. 9, 2024

(54) E-COMMERCE DOCUMENT FRAMEWORK WITH CROSS-SOURCE AND CROSS-DOCUMENT VALIDATION

(71) Applicant: Amazon Technologies, Inc., Seattle, WA (US)

(72) Inventors: Catalin Constantin, Seattle, WA (US); Miao Chen, Snoqualmie, WA (US); Fei Yuan, Redmond, WA (US); Sreeja Das, Seattle, WA (US); Qingyun Li, Mill Creek, WA (US); Abhishek H Iyer, Bothell, WA (US); Avinash Vinodkumar Singh, Seattle, WA (US); Nathan P. Shanmugam, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 161 days.

(21) Appl. No.: 17/216,500

(22) Filed: Mar. 29, 2021

(51) Int. Cl.
  *G06Q 30/04* (2012.01)
  *G06F 16/93* (2019.01)
  *G06F 40/186* (2020.01)

(52) U.S. Cl.
  CPC .............. *G06Q 30/04* (2013.01); *G06F 16/93* (2019.01); *G06F 40/186* (2020.01)

(58) Field of Classification Search
  CPC ........ G06Q 30/04; G06F 16/93; G06F 40/186
  See application file for complete search history.

(56) References Cited

U.S. PATENT DOCUMENTS

| 6,044,362 A * | 3/2000 | Neely ................... G06Q 20/40 |
| | | 705/40 |
| 6,732,175 B1 * | 5/2004 | Abjanic ................ H04L 67/563 |
| | | 709/227 |
| 6,816,865 B2 * | 11/2004 | O'Brien ................ G06Q 30/06 |
| | | 709/227 |

(Continued)

FOREIGN PATENT DOCUMENTS

WO   WO-0173650 A1 * 10/2001 ............. G06Q 10/10

OTHER PUBLICATIONS

Unknown, "Getting Started with cXML" cxml.org, Feb. 2021, Retrieved from http://xml.cxml.org.current/cXMLGettingStarted.pdf, pp. 1-63.

*Primary Examiner* — Benjamin Smith
(74) *Attorney, Agent, or Firm* — Robert C. Kowert; Kowert, Hood, Munyon, Rankin & Goetzel, P.C.

(57) ABSTRACT

Methods, systems, and computer-readable media for an e-commerce document framework with cross-source and cross-document validation are disclosed. A document framework system determines a document template associated with a request to generate a document comprising a record of one or more transactions. The document template indicates a plurality of data sources that store a plurality of data elements for the document and a plurality of validation tasks. The document framework system receives the plurality of data elements for the document from the plurality of data sources. The document framework system performs the validation tasks to determine the correctness of the data elements. The validation comprises cross-source validation and cross-document validation. The document framework system generates the document based (at least in part) on the data elements if the validation is successful.

20 Claims, 8 Drawing Sheets

(56) References Cited

U.S. PATENT DOCUMENTS

| | | | | |
|---|---|---|---|---|
| 7,096,270 | B2* | 8/2006 | Abjanic | H04L 67/563 709/240 |
| 7,111,076 | B2* | 9/2006 | Abjanic | H04L 67/02 709/201 |
| 7,146,422 | B1* | 12/2006 | Marlatt | G06F 40/226 709/227 |
| 7,340,422 | B2* | 3/2008 | Fisher | G06Q 20/102 705/40 |
| 7,373,349 | B2* | 5/2008 | O'Brien | H04L 67/02 709/227 |
| 7,475,081 | B2* | 1/2009 | O'Brien | G06Q 30/06 709/227 |
| 7,594,033 | B2* | 9/2009 | Abjanic | H04L 69/329 709/201 |
| 8,165,934 | B2* | 4/2012 | Manista | G06Q 40/12 705/30 |
| 8,296,461 | B2* | 10/2012 | Sirdevan | G06Q 10/06 707/999.2 |
| 8,401,939 | B2 | 3/2013 | Lam et al. | |
| 8,694,429 | B1 | 4/2014 | Ballaro et al. | |
| 8,756,117 | B1* | 6/2014 | Ballaro | G06Q 30/0633 705/26.1 |
| 8,825,559 | B2 | 9/2014 | Chelniak et al. | |
| 9,396,388 | B2 | 7/2016 | Amtrup et al. | |
| 9,514,205 | B1* | 12/2016 | Yazicioglu | G06F 16/235 |
| 9,946,776 | B1* | 4/2018 | Yazicioglu | G06F 40/186 |
| 10,127,558 | B2 | 11/2018 | Bulman et al. | |
| 10,248,653 | B2* | 4/2019 | Blassin | G06N 20/00 |
| 10,354,000 | B2 | 7/2019 | Wilczek et al. | |
| 10,726,032 | B2* | 7/2020 | Visbal | G06F 40/186 |
| 10,733,675 | B2 | 8/2020 | Mittal et al. | |
| 10,963,934 | B1* | 3/2021 | Pylant | G06Q 30/0235 |
| 10,977,744 | B1* | 4/2021 | Hsu | G06Q 40/125 |
| 10,997,195 | B1* | 5/2021 | Sekar | G06N 20/00 |
| 11,257,134 | B2* | 2/2022 | Balasubramanian | G06Q 10/087 |
| 11,270,389 | B2* | 3/2022 | Lee | G06Q 40/12 |
| 2003/0023604 | A1* | 1/2003 | O'Brien | G06Q 30/06 |
| 2003/0028447 | A1* | 2/2003 | O'Brien | H04L 67/02 718/100 |
| 2003/0028654 | A1* | 2/2003 | Abjanic | H04L 43/0876 709/229 |
| 2003/0069975 | A1* | 4/2003 | Abjanic | H04L 63/0428 709/227 |
| 2004/0044951 | A1* | 3/2004 | Repko | G06Q 30/06 715/224 |
| 2004/0158510 | A1* | 8/2004 | Fisher | H04M 15/58 705/30 |
| 2004/0205597 | A1* | 10/2004 | Abjanic | H04L 63/0428 705/1.1 |
| 2004/0230660 | A1* | 11/2004 | Abjanic | H04L 67/1008 709/207 |
| 2005/0089129 | A1* | 4/2005 | O'Brien | H04L 67/75 375/371 |
| 2005/0149489 | A1* | 7/2005 | Abjanic | H04L 67/02 |
| 2008/0120313 | A1* | 5/2008 | O'Brien | G06Q 30/0603 |
| 2008/0221915 | A1* | 9/2008 | Berkowitz | G06Q 10/06 705/1.1 |
| 2009/0119416 | A1* | 5/2009 | Sirdevan | G06Q 10/06 709/246 |
| 2009/0319402 | A1* | 12/2009 | Manista | G06Q 40/12 705/30 |
| 2012/0290453 | A1* | 11/2012 | Manista | G06Q 40/12 705/30 |
| 2013/0339187 | A1* | 12/2013 | Carter | G06Q 20/102 705/26.41 |
| 2014/0052641 | A1* | 2/2014 | Chai | G06Q 20/102 705/37 |
| 2014/0337188 | A1* | 11/2014 | Bennett | G06Q 20/102 705/40 |
| 2014/0358723 | A1* | 12/2014 | Ballaro | G06Q 30/0633 705/26.8 |
| 2015/0237023 | A1* | 8/2015 | Abjanic | H04L 67/101 713/153 |
| 2016/0162478 | A1* | 6/2016 | Blassin | G06Q 10/063112 706/12 |
| 2017/0193061 | A1* | 7/2017 | Visbal | G06F 40/186 |
| 2018/0210935 | A1* | 7/2018 | Yazicioglu | G06F 40/186 |
| 2019/0385240 | A1* | 12/2019 | Lee | G06F 16/215 |
| 2020/0118076 | A1* | 4/2020 | Ballaro | G06Q 30/0635 |
| 2020/0410562 | A1* | 12/2020 | Balasubramanian | G06Q 10/087 |
| 2022/0027345 | A1* | 1/2022 | Wu | H04L 9/3297 |
| 2022/0198580 | A1* | 6/2022 | Lee | G06Q 40/12 |

* cited by examiner

E-COMMERCE DOCUMENT FRAMEWORK WITH CROSS-SOURCE AND CROSS-DOCUMENT VALIDATION

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services or systems that interact with clients. As the scale and scope of distributed systems have increased, the tasks of provisioning, administering, and managing system resources have become increasingly complicated.

Distributed systems may be used in complex e-commerce environments in which subsystems collaborate to perform transactions and other e-commerce tasks. For example, if a customer places an order for goods via an Internet-accessible store, numerous systems or services may be used throughout the lifecycle of the order. These systems or services may participate in tasks such as creating a record of the order, verifying the customer's payment method, verifying the customer's address, generating a bill and/or billing the payment method, fulfilling and packaging the order, shipping and delivering the order, and resolving customer service issues. One or more of these tasks may involve creating or updating data to capture aspects of transaction(s), such as amounts billed, taxes assessed, updates to inventory, and so on. These datasets may be stored by a variety of distinct and independent data sources.

Figure 1:
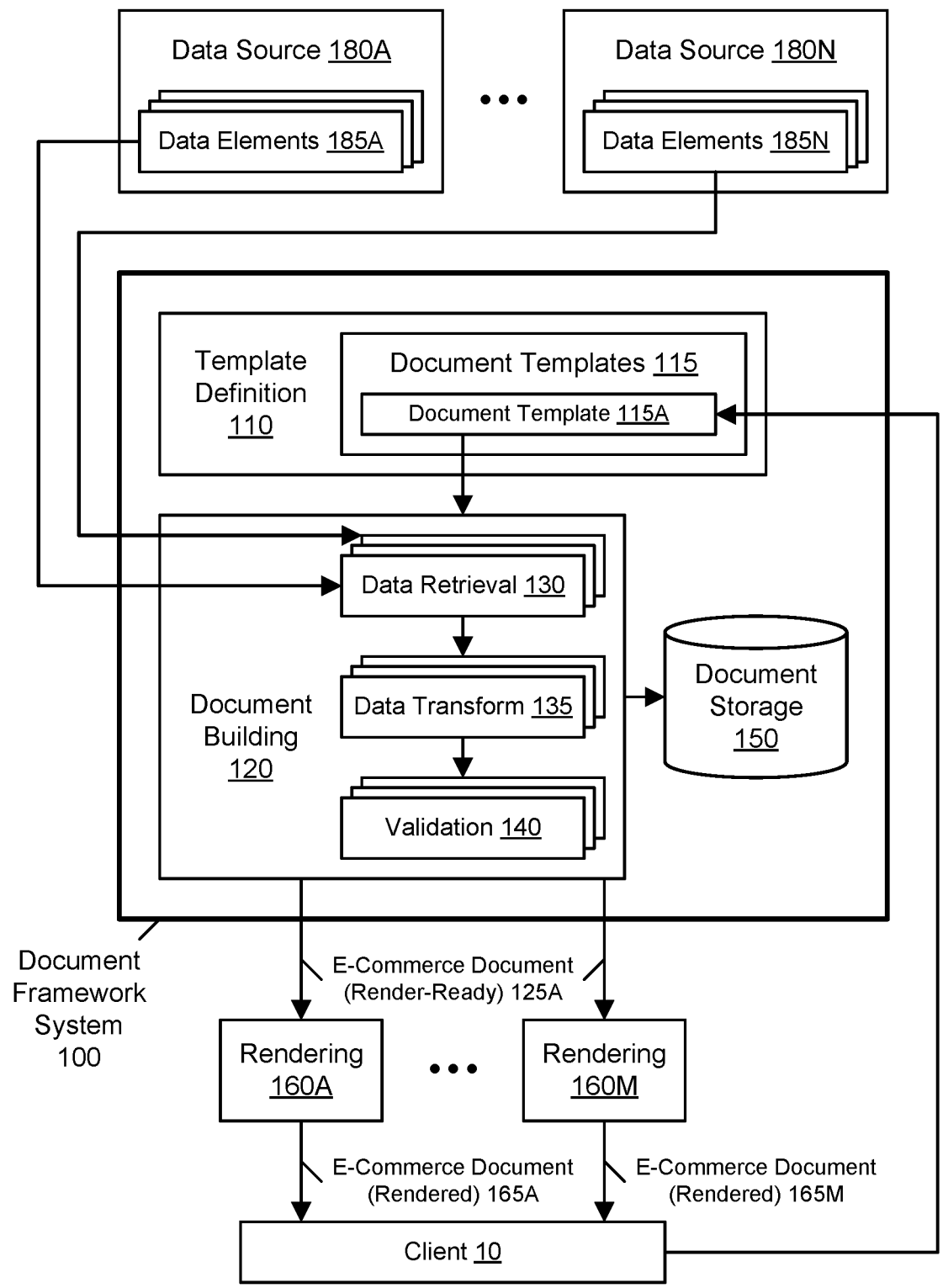
FIG. 1 illustrates an example system environment for an e-commerce document framework with cross-source and cross-document validation, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Embodiments of methods, systems, and computer-readable media for an e-commerce document framework with cross-source and cross-document validation are described. In e-commerce (e.g., commercial transactions conducted over the Internet), businesses and other organizations rely on a variety of e-commerce documents. An e-commerce document may represent a record of one or more transactions, e.g., between an e-commerce store and a customer. An e-commerce document such as an invoice may include a document, report, or other artifact that a business issues as an official record of sale. An invoice may facilitate the customer's internal business processes such as tax reporting, reconciliation, and remitting payment. Regardless of the particular payment method that the customer uses to pay for a purchase (e.g., invoicing, credit card, or bank account), the customer may often need one or more artifacts (e.g., e-commerce documents or invoices) to complete the internal payment reconciliation that is required in their business processes.

Business-to-business (B2B) customers may particularly rely on e-commerce document types such as monthly consolidated requests for payment, receipts, shipment notifications, VAT invoices, cXML (commerce eXtensible Markup Language) documents, e-Invoicing, and so on. B2B customers often prefer to minimize the number of documents they rely on. For example, many B2B customers may prefer using their VAT invoices as a request for payment when deferred payment is applied or as a receipt of payment when instant payment is applied. To generate an e-commerce document that can be used for multiple purposes, it may be necessary to build the document using data derived from multiple authoritative data sources. However, those data sources may be inconsistent. For example, prior approaches to e-commerce document management have resulted in problems such as the VAT invoice amount not matching the expected payment amount, reconciliation failures due to data field inaccuracy (e.g., bill-to address and line items), and reconciliation failures due to data field inconsistency with other documents (e.g., business analytics reports and e-invoices).

The aforementioned challenges, among others, are addressed by embodiments of the techniques described herein, whereby a document framework system may generate high-quality e-commerce documents with values derived from multiple authoritative data sources. A customer may define a document template that indicates different authoritative data sources using a federated data model, data transform tasks, validation tasks, and so on. Different retrieval components (e.g., plug-ins) may acquire data from the various data sources. After the data is obtained from these sources and transformed (e.g., by calculating sums or aggregations) to begin building an e-commerce document according to the template, the document framework system may perform the validation tasks to ensure the correctness of the resulting document. For example, cross-source validation and cross-document validation tasks may be performed. As the document is built, the document framework system may persistently store versions of the document for auditability and traceability. By combining values from various data sources according to templates, the document framework system may generate e-commerce documents that can be used for multiple purposes. For example, the same document may be used as a VAT invoice and also as a request for payment or receipt of payment. The document framework system may generate an e-commerce document in a "render-ready" or "display-ready" format such that different rendering components can render the document for display or consumption by users without recalculating the data. By performing validation of data values from different data sources and by generating documents with data values that are not altered by downstream systems, the document framework system may eliminate inconsistencies, inaccuracies, and other errors in e-commerce documents such as invoices.

As one skilled in the art will appreciate in light of this disclosure, embodiments may be capable of achieving certain technical advantages, including some or all of the following: (1) reducing inconsistencies, inaccuracies, and other errors in e-commerce documents (e.g., invoices) by performing validation of data values from one data source with respect to values from one or more other data sources; (2) reducing inconsistencies, inaccuracies, and other errors in e-commerce documents by performing validation of documents with respect to other documents; (3) reducing inconsistencies, inaccuracies, and other errors in e-commerce documents by generating the documents in a render-ready format such that downstream systems need not perform transformations of data values in rendering the documents for display or consumption by users; (4) facilitating auditability and traceability for e-commerce documents by persistently storing versions of documents as the documents are generated; and so on.

FIG. 1 illustrates an example system environment for an e-commerce document framework with cross-source and cross-document validation, according to some embodiments. A document framework system 100 may provide a trusted e-commerce document and payment reconciliation experience for customers. In some embodiments, the document framework system 100 may be implemented by a business or other organization, such as an Internet-accessible store or other e-commerce entity, which issues e-commerce documents to customers or for the benefit of customers. Customers served by the system 100 may include other businesses (e.g., business-to-business customers) and/or non-business consumers (e.g., business-to-consumer customers). E-commerce (electronic commerce) documents may include invoices and other records of e-commerce transactions, e.g., transactions for the sale or lease of goods or services conducted via the Internet. The document framework system 100 may provide variety and configurability of e-commerce documents. In some embodiments, different customers may require diverse types of e-commerce documents and customization of document data. The document framework system 100 may provide governance of document quality to ensure timeliness, completeness, integrity, accuracy, and consistency.

An e-commerce document may represent a record of one or more transactions between an e-commerce entity (e.g., an Internet-accessible store) and a customer. An e-commerce document may include an invoice, order document, report, credit note, statement, tax report, shipment report, reconciliation report, aggregated payment received report, or other artifact that a business issues as an official record of a sale or a transaction. An invoice, for example, may facilitate the customer's internal business processes such as tax reporting, reconciliation, and remitting payment. Regardless of the particular payment method that the customer uses to pay for a purchase (e.g., invoicing, credit card, or bank account), the customer may often need one or more artifacts (e.g., e-commerce documents or invoices) to complete the internal payment reconciliation that is required in their business processes. For example, invoices or other e-commerce documents may include a payment request that a customer receives to indicate how much they need to pay an e-commerce store, a set of line item data sent by an e-commerce store along with the payment settlement transaction that the customer receives through their credit card, a reconciliation report on business analytics that the customer downloads to complete their internal reconciliation, the VAT invoice that the customer receives from an e-commerce store for tax reporting as well as for payment reconciliation, and so on. In some embodiments, an e-commerce document (e.g., an invoice document) may include one or more of the following elements: reference fields for invoice numbers, purchase order, time period, and so on; customer information such as a business address, bill-to address, VAT ID, and so on; line items such as descriptions, amount breakdowns, tax rates, and so on; summary information such as totals and adjustments; and payment information such as a payment method, currency, payment term, paid amount, due amount, remittance details, and so on.

Business-to-business (B2B) customers may particularly rely on invoices and other e-commerce documents. For example, B2B customers may rely on invoice document types such as monthly consolidated requests for payment, receipts, shipment notifications, cXML (commerce eXtensible Markup Language) documents, e-Invoicing, and so on. B2B customers may vary in terms of policies and business flows. B2B customers often prefer to minimize the number of documents they rely on. For example, many B2B customers may prefer using their VAT invoices as a request for payment when deferred payment is applied or as a receipt of payment when instant payment is applied. For some B2B customers, tax invoices may be critical because they are used for payment reconciliation purposes as payment requests or payment receipts. However, prior approaches to e-commerce document management have resulted in problems such as the VAT invoice amount not matching the expected payment amount, reconciliation failures due to data field inaccuracy (e.g., bill-to address and line items), and reconciliation failures due to data field inconsistency with other documents (e.g., business analytics reports and e-invoices). Whether B2B customers receive multiple invoice documents or single, multi-purpose documents which require complex enrichment, the document framework system 100 may provide invoices that achieve a high standard of data completeness, consistency, and accuracy.

The document framework system 100 may generate e-commerce documents that meet a variety of standards. In some embodiments, the document framework system 100 may meet one or more service-level agreements (SLAs) for document delivery such that the elapsed time from an e-commerce document being due to the delivery of the e-commerce document to the customer is within a specified range. In some embodiments, the document framework system 100 may meet a data integrity standard such that no data element in the e-commerce document should conflict with any other data element in the same e-commerce document. For example, the system 100 may generate VAT invoices with an import fee deposit as a line item, even though the line item may not be mandatory for a tax invoice, to ensure that the total sum of all line item amounts on the VAT invoice (without import fee deposit) are equal to the total charged amount on the same document.

In some embodiments, the document framework system 100 may meet a data accuracy standard such that all data elements in the invoice must match the data from the corresponding authoritative sources at its immutable state for the purchase. For example, the payment due amount on the invoice may match the amount of the account receivable within the e-commerce store's systems. As another example, the item tax rate on the invoice may match the finalized tax rate when the item is fulfilled, not the estimated tax. In some embodiments, the document framework system 100 may meet a data consistency standard such that all data elements in the invoice match the data from other formats of e-commerce documents or reconciliation tools for the same purchases (either using the same or different templates). For example, a PDF invoice may breach the consistency standard if the total payment amount due does not match the amount displayed on an invoices page in a user interface, even if the amount on the PDF invoice is accurate.

In some embodiments, the document framework system 100 may meet a data completeness standard such that no data elements are missing on the e-commerce documents per the defined schemas of the documents. For example, a credit memo for an over-refund or a goodwill refund may contain a reference ID to a previous invoice. As another example, an e-invoice (e.g., an invoice in cXML, format) that is consumable by the customer's system may include a discounted amount broken down at a line item level in addition to the total discounted amount.

In some embodiments, the document framework system 100 may meet a customer expectation standard. The customer's expectation for a particular e-commerce document may be determined by the configurations they set up with the system 100, such as their tax exemption status, invoice consolidation preference, preferred transmission channel of invoices, preferred optional fields on the invoices, and who should receive or manage the invoices (for access control). An invoice or other e-commerce document that is generated using the document framework system 100 and sent to the customer may honor these configurations. For example, if the customer has configured to receive invoices by PO (purchase order), the system 100 should not send a monthly invoice. As another example, if the customer has configured the receiver of the invoices (e.g., their account payables contact), the system 100 should not email invoices to other contacts. As yet another example, if the customer's configuration indicates tax exemption, the system 100 should zero out all tax amounts on the invoices.

The document framework system 100 may generate e-commerce documents based (at least in part) on document templates 115. Document templates 115 may be referred to as document framework templates. Using a component for template definition 110, a client 10 (e.g., a customer of an e-commerce entity that issues e-commerce documents) may define a document template 115A for a particular kind of e-commerce document. The template definition component 110 may include one or more user interfaces (e.g., one or more graphical user interfaces, command-line interfaces, voice-enabled interfaces, and so on) and/or one or more application programming interfaces (APIs) or other programmatic interfaces.

A document template 115A may include indications of particular data sources 180A-180N, e.g., via specified entities which are mapped to respective data authorities. A document template 115A may include references to or other indications of plug-ins to be used in building 120 an e-commerce document. For example, the template 115A may indicate one or more plug-ins to use for data retrieval 130, one or more plug-ins to use for data transformation 135 tasks, and one or more plug-ins to use for validation 140 tasks of data elements and/or documents. In some embodiments, some plug-ins may be specific to particular data sources and may be used independently of other plug-ins. For example, a data retrieval plug-in for one data source 180A may differ from a data retrieval plug-in for another data source 180N, and the two plug-ins may be used independently of one another to acquire data from the corresponding data sources. As another example, the template 115A may indicate one or more source-specific data transformation plug-ins, e.g., to perform data aggregations for a particular kind of e-commerce document or to map data elements from one or more source schemas to a unified target schema. Because plug-ins specific to a particular data source may be developed by one team in a manner independent of other teams responsible for other data sources, development bottlenecks may be reduced. A document template 115A may include or reference a trim-down specification that may be used to extract display-ready data values for rendering 160A-160M. A document template 115A may indicate relationships between or among various entities, e.g., data sources.

In some embodiments, a client 10 or other entity may request that the document framework system 100 produce one or more e-commerce documents. The client may send the request via one or more user interfaces (e.g., one or more graphical user interfaces, command-line interfaces, voice-enabled interfaces, and so on) and/or one or more application programming interfaces (APIs) or other programmatic interfaces. The request may indicate a particular template 115A (e.g., a template owned and/or defined by the client 10) to be used for the requested e-commerce document, or the system 100 may determine that the request is associated with a particular template 115A using client-specific configuration data. In some embodiments, requests for the system 100 to generate e-commerce documents may be generated automatically according to a schedule, e.g., so that an updated document of a particular type is generated every month. In some embodiments, requests for the system 100 to generate e-commerce documents may be generated manually. In some embodiments, requests for the system 100 to generate e-commerce documents may be generated by other components on behalf of the client 10, e.g., from an ordering system once an item has shipped. In some embodiments, some types of e-commerce documents may be generated in a particular order with respect to other types of e-commerce documents, e.g., in a predefined sequence.

The document framework system 100 may generate e-commerce documents based (at least in part) on data 185A-185N stored by a plurality of data sources 180A-180N. The document framework system 100 may generate e-commerce documents based (at least in part) on the particular data sources indicated by particular document templates 115, e.g., template 115A. The data sources 180A-180N may represent authoritative stores for particular datasets. For example, data elements 185A-185N stored by the data sources 180A-180N may include purchase, fulfillment, and payment information such as item, quantity, price, tax, payment executions, and invoices/pay later. The data source 180A may store data 185A using a different format and/or organizational scheme than that which the data source 180N uses to store 185N. In some embodiments, a single data element may have one authoritative data source among the data sources 180A-180N. In performing document building 120 according to a particular template 115A, the system 100 may perform data retrieval 130 of one or more data elements from each of the data sources indicated in the template, e.g., one or more of data elements 185A from data source 180A and one or more of data elements 185N from data source 180N.

Different components (e.g., source-specific plug-ins) for data retrieval 130 may acquire data from the various data sources, and different components (e.g., source-specific plug-ins) for data transformation 135 may be used to build the document. Data transform tasks 135 may be performed without performing additional data retrieval. As a document 125A is built using different data elements and transformations of those data elements, different versions of the document may be generated. Using document storage 150, the document framework system 100 may persistently store versions of documents for purposes of auditability, traceability, and regulatory compliance. The document framework system 100 may provide an audit history of data mutation for e-commerce document generation processes.

The data sources 180A-180N may be maintained by separate and distinct subsystems, e.g., an invoicing subsystem, a business account subsystem, a payments subsystem, a tax subsystem, and so on. Similarly, plug-ins corresponding to the various data sources 180A-180N may also be separate and distinct. In some embodiments, business processes such as fulfillment of goods and services, settlement of payments, and application of discounts and promotions may be independent, asynchronous processes without a systematic synchronization and validation point. Each of these processes may maintain its own status information (e.g., in the form of data 185A-185N) that is combined at a later point when an invoice or other e-commerce document is generated. Because these processes operate based on independent datasets that are copies or subsets of the original, errors may be introduced in the form of missing information, inaccuracies (e.g., rounding errors), and other gaps that are unaccounted for during cut-off boundaries. When these errors occur to significant data (e.g., a payment due amount), the errors may manifest themselves as payment defects after the fact. For example, a customer may underpay by one cent due to a rounding error, and the e-commerce store may ask for the shortfall. As another example, when a discount applies to an item in the purchase, the payment receipt (in the form of line item data that customers receive from their credit card statements), VAT invoice, and other documents may show different amounts within $0.01 of discrepancy.

To eliminate or mitigate such errors, the document framework system 100 may perform validation tasks 140 across data sources and/or across documents. The validation 140 may ensure data completeness, consistency, and accuracy, and documents that fail the validation may not be generated by the system 100 or may be generated with indications of validation failure. Additionally, the document framework system 100 may generate e-commerce documents in a "render-ready" or "display-ready" format such that no additional calculations need be performed when documents are rendered using various rendering pipelines 160A-160M (e.g., to generate a PDF document, cXML document, or report in a graphical user interface [GUI] display) for display and/or consumption by customers. As shown in FIG. 1, the system 100 may generated an e-commerce document 125A according to the template 115A in a render-ready or display-ready format.

In some embodiments, the document framework system 100 may provide, via the document templates 115, a formal mechanism to produce e-commerce documents enriched with data that maps back to multiple data authorities (e.g., data sources 180A-180N). Each authority may have clear data dependency and ownership over the data entities that it produces. In some embodiments, a single e-commerce document 125A produced by the system 100 may map back to multiple authorities and/or may serve multiple purposes. For example, a tax invoice may be used for tax reporting purposes and also as a payment request or receipt. As another example, in prior approaches, tax systems may generate VAT invoice documents (e.g., as PDF documents) for each package shipped, and the VAT invoice documents may include only data from a single source that may be payment-agnostic. However, customers may often wish to use a VAT invoice as a payment request or payment receipt, such that the invoice document should be payment-aware. As yet another example, import and export fees may not be required on tax invoices but may be required for payment reconciliation. To address these challenges, the document framework system 100 may generate e-commerce documents that combine data elements from multiple authoritative data sources and can be used for different purposes.

Using some prior approaches, each individual invoice rendering or delivery pipeline (e.g., a PDF pipeline, an e-invoice pipeline, and so on) had to build its own logic to assemble the invoices by computing and aggregating the data from multiple sources, sometimes before the data in the source systems was finalized (e.g., getting an estimated tax amount rather than finalized amount). To address these challenges, the document framework system 100 may ensure the quality of e-commerce documents generated from distributed pipelines (and stored by data sources 180A-180N) and requiring a specific mix of data elements. The document framework system 100 may generate e-commerce documents using e-commerce document templates 115. The document framework system 100 may generate e-commerce documents according to customer-specific preferences (e.g., how data elements or documents should be consolidated, delivered, and so on) as reflected in the templates 115. The document framework system 100 may implement an e-commerce document federation framework or invoice document federation framework. The framework may enable a client to define a document framework template 115A for an e-commerce document (e.g., an invoice document) through a federated data model to support variety and configurability of invoices. The document framework system 100 may perform customized validations 140 for the data in the e-commerce voice document, e.g., to enforce governance of data quality.

The document framework system 100 may generate an invoice document 125A in a "render-ready" or "display-ready" format according to the document template 115A. Using the render-ready or display-ready format, contents of the document 125A may be transmitted to a client 10 by one or more downstream components such as rendering pipelines or display pipelines 160A-160M without performing additional calculations (e.g., calculating sums or aggregations, rounding up or down) of e-commerce data values. For example, one rendering or display component 160A may generate a rendered or displayable version 165A of the render-ready document 125A in a PDF format, and another rendering or display component 160M may generate another rendered or displayable version 165M of the render-ready document 125A in a cXML format. In some embodiments, the rendering components 160A-160M may not alter or recalculate any e-commerce values in the render-ready document 125A, e.g., any sums, aggregated values, or other numerical values calculated by the system 100 in building the document 125A. For the same e-commerce document generated in a render-ready or display-ready format, an e-commerce value rendered using one rendering pipeline 160A may not vary from the same e-commerce value rendered using another rendering pipeline 160M. In some embodiments, the document building component 120 and/or rendering components 160A-160M may use a trim-down specification of the template 115A to extract display-ready data values. In some embodiments, the rendering components 160A-160M may select some data values but not others from the render-ready document 125A to produce rendered documents 165A-165M. In some embodiments, the rendering components 160A-160M may reorder some data values from the render-ready document 125A. In some embodiments, the presentation order of some types of values (e.g., an order of payments) may not be changed. Documents 165A-165M may be rendered according to rendering templates that may differ from document type to document type.

Validation 140 may be performed to ensure data completeness, integrity, accuracy, consistency, and so on. In some embodiments, the document framework system 100 may perform a variety of validation tasks, e.g., as indicated by a document template. The document framework system 100 may perform validation for internal consistency, e.g., to ensure that amounts add up properly). The document framework system 100 may perform cross-source validation, e.g., to ensure data consistency between or among different data authorities such as an ordering system, a tax system, a payment system, and so on. The document framework system 100 may perform validation for cross-document consistency, e.g., to ensure that data in one document does not conflict with data in another document. The document framework system 100 may perform validation for mandatory field inclusion. In some embodiments, some validation failures may be significant enough to suspend particular invoices from being delivered to customers (e.g., if amounts fail to match on a payment request), while other validation failures may result in an error warning and/or require other actions (e.g., if payment remittance data on a tax invoice is incorrect, the e-commerce store may be required to deliver the tax invoice due to a tax regulation authority but may choose to blank out the payment remittance data and seek other remediation).

Documents such as document 125A produced by the document framework system 100 may be used as authoritative display-ready data for each rendering pipeline 160A-160M to consume, render, and transmit to customers. For example, a cXML pipeline may assemble the actual XML document using the render-ready e-commerce document, a VAT pipeline may assemble the actual VAT PDF document, and so on. In some embodiments, the rendering process in each pipeline may not perform additional data manipulation or enrichment, such that the document framework system 100 need not inspect or re-validate the rendered output. Documents may be rendered according to customer-specific preferences and/or rendering templates. As an example of how the document framework system 100 can use different rendering pipelines for the same data, the system may generate invoice data payloads according to respective templates for one pipeline for the cXML invoice format and another pipeline for a different invoicing payment method. If the customer selected purchase level consolidation that requires a "match" between various document types that the customer receives, the system 100 may account for that in assembling and validating the respective document payloads.

In one embodiment, one or more components of the document framework system 100 may be implemented using resources of a provider network. The provider network may represent a network set up by an entity such as a private-sector company or a public-sector organization to provide one or more services (such as various types of network-accessible computing or storage) accessible via the Internet and/or other networks to a distributed set of clients. The provider network may include numerous services that collaborate according to a service-oriented architecture to provide the functionality and resources of the system 100. The provider network may include numerous data centers hosting various resource pools, such as collections of physical and/or virtualized computer servers, storage devices, networking equipment and the like, that are used to implement and distribute the infrastructure and services offered by the provider. Compute resources may be offered by the provider network to clients in units called "instances," such as virtual or physical compute instances. In one embodiment, a virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). In various embodiments, one or more aspects of the document framework system 100 may be implemented as a service of the provider network, the service may be implemented using a plurality of different instances that are distributed throughout one or more networks, and each instance may offer access to the functionality of the service to various clients. Because resources of the provider network may be under the control of multiple clients (or tenants) simultaneously, the provider network may be said to offer multi-tenancy and may be termed a multi-tenant provider network. The provider network may be hosted in the cloud and may be termed a cloud provider network. In one embodiment, portions of the functionality of the provider network, such as the document framework system 100, may be offered to clients in exchange for fees.

Figure 7:
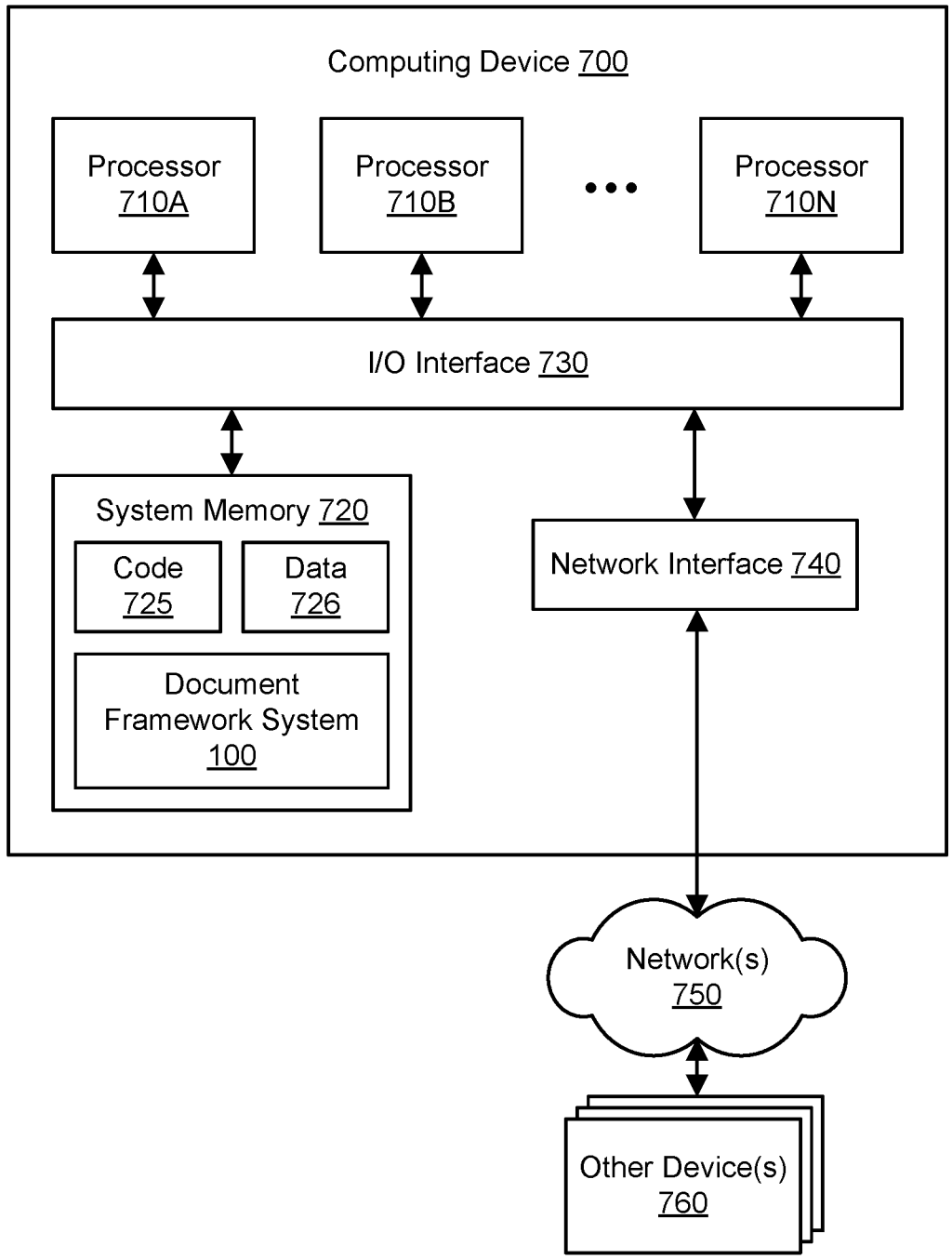
FIG. 7 illustrates an example computing device that may be used in some embodiments.

In various embodiments, components of the system 100 may be implemented using any suitable number and configuration of computing devices, any of which may be implemented by the example computing device 700 illustrated in FIG. 7. In some embodiments, the computing devices may be located in any suitable number of data centers or geographical locations. In various embodiments, at least some of the functionality of the document framework system 100 may be provided by the same computing device or by different computing devices. In various embodiments, if any of the components of the document framework system 100 are implemented using different computing devices, then the components and their respective computing devices may be communicatively coupled, e.g., via one or more networks. Any of the components of the document framework system 100 may represent any combination of software and hardware usable to perform their respective functions. In some embodiments, operations implemented by the document framework system 100 may be performed automatically, e.g., without a need for user initiation or user intervention after an initial configuration stage, and/or programmatically, e.g., by execution of program instructions on at least one computing device. In some embodiments, the document framework system 100 may include additional components not shown, fewer components than shown, or different combinations, configurations, or quantities of the components shown.

One or more clients 10 of the document framework system 100 may represent one or more external devices, systems, or entities with respect to the database. Client devices 10 may be managed or owned by one or more customers of the document framework system 100. In one embodiment, the client devices may be implemented using any suitable number and configuration of computing devices, any of which may be implemented by the example computing device 700 illustrated in FIG. 7. Clients 10 may convey network-based service requests to the system 100 via one or more networks, e.g., to request that e-commerce documents be generated or rendered. The network(s) may encompass any suitable combination of networking hardware and protocols necessary to establish network-based communications between client devices and the document framework system 100. For example, the network(s) may generally encompass the various telecommunications networks and service providers that collectively implement the Internet. In one embodiment, the network(s) may also include private networks such as local area networks (LANs) or wide area networks (WANs) as well as public or private wireless networks. For example, both a given client device and the document framework system 100 may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the document framework system 100. In one embodiment, client devices may communicate with the document framework system 100 using a private network rather than the public Internet. In various embodiments, the various components of the document framework system 100 may also communicate with other components of the database using one or more network interconnects.

Figure 2:
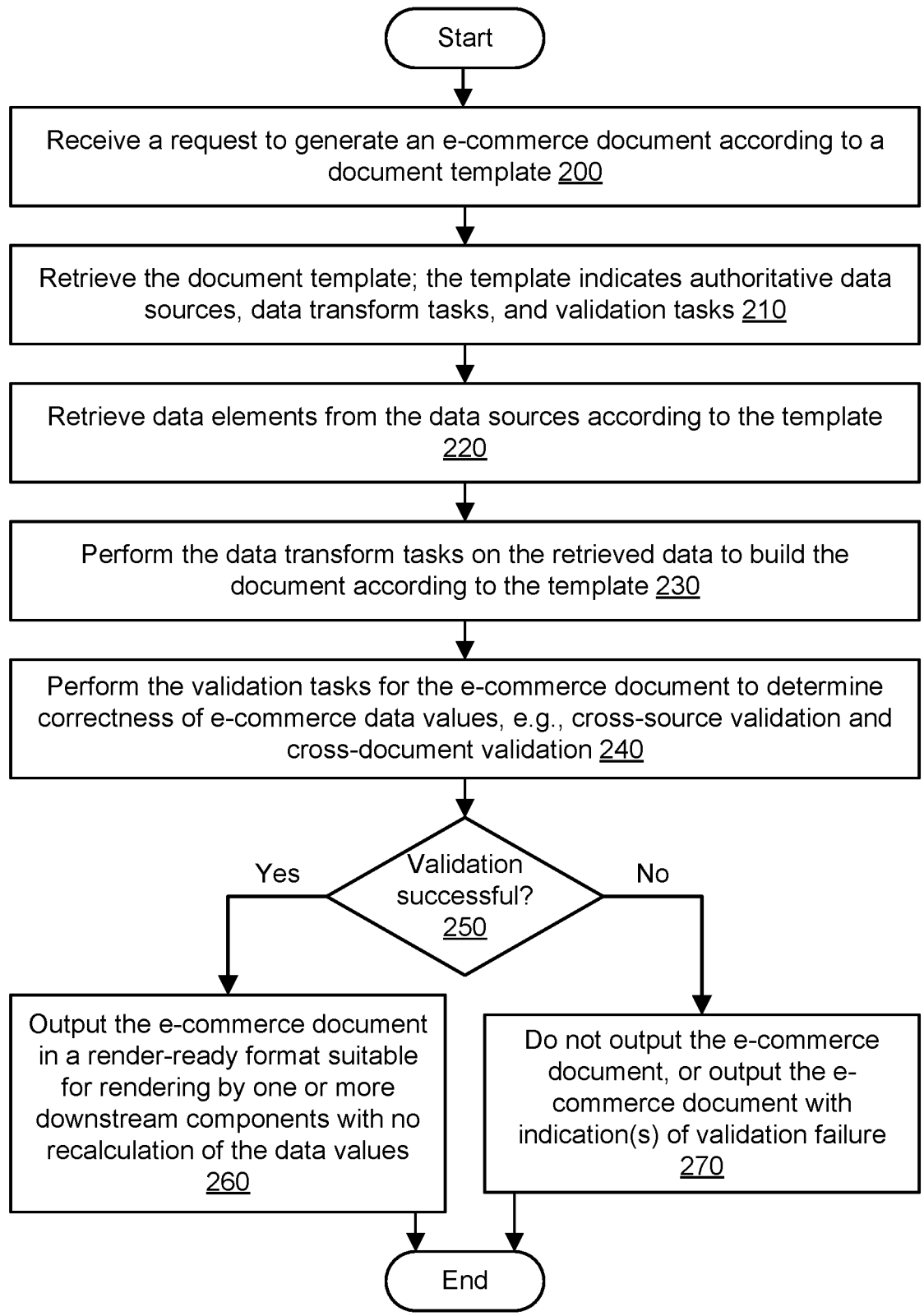
FIG. 2 is a flowchart illustrating a method for an e-commerce document framework with cross-source and cross-document validation, according to some embodiments.

FIG. 2 is a flowchart illustrating a method for an e-commerce document framework with cross-source and cross-document validation, according to some embodiments. As shown in 200, a document framework system may receive a request to generate an e-commerce document according to a particular document template. The request may indicate a particular template (e.g., a template owned and/or defined by the client) to be used for the requested e-commerce document, or the system may determine that the request is associated with a particular template using client-specific configuration data. In some embodiments, requests for the system to generate e-commerce documents may be generated automatically according to a schedule, e.g., so that an updated document of a particular type is generated every month. In some embodiments, requests for the system to generate e-commerce documents may be generated manually. In some embodiments, requests for the system to generate e-commerce documents may be generated by other components, e.g., from an ordering system once an item has shipped.

As shown in 210, the document framework system may retrieve the document template. The document template may indicate a plurality of authoritative data sources for data elements of the desired e-commerce document, e.g., via specified entities which are mapped to respective data authorities. The document template may include indications of plug-ins to be used in building an e-commerce document. For example, the template may indicate one or more plug-ins to use for data retrieval and one or more plug-ins to use for validation of data elements and/or documents. In some embodiments, some plug-ins may be specific to particular data sources, e.g., a data retrieval plug-in for one data source may differ from a data retrieval plug-in for another data source. As another example, the template may indicate one or more data transformation plug-ins, e.g., to perform data aggregations for a particular kind of e-commerce document. A document template may include a trim-down specification that may be used to extract display-ready data values for rendering of the document.

As shown in 220, the document framework system may retrieve data elements from the data sources indicated by the template. Data elements may be retrieved from one data source using one source-specific plug-in, and data elements may be retrieved from another data source using another source-specific plug-in. As shown in 230, the document framework system may begin building the e-commerce document according to the template by performing one or more data transform tasks using the retrieved data. In building the e-commerce document, the system may perform retrieval of data elements and transformation of at least some of the data elements, e.g., according to data transform plug-ins specified by the document template. Data elements from one data source may be transformed using one source-specific plug-in, and data elements from another data source may be transformed using another source-specific plug-in. As a document is built using different data elements and transformations of those data elements, different versions of the document may be generated. The document framework system may persistently store versions of documents for purposes of auditability, traceability, and regulatory compliance.

As shown in 240, the document framework system may perform validation to determine the correctness of e-commerce data values in the e-commerce document. The validation may ensure data completeness, consistency, and accuracy. The validation may include cross-source validation to determine the correctness of values obtained from two or more data sources. The validation may include cross-document validation to determine the correctness of values with respect to one or more other e-commerce documents. For example, if the document framework system issues multiple documents to the client referencing the same items, orders, or units, but the documents do not align on the exact same set of units, the cross-document validation may ensure the accuracy of those values.

As shown in 250, the method may determine whether the validation was successful. If validation was successful, then as shown in 260, the document framework system may output the e-commerce document in a render-ready or display-ready format. In the render-ready or display-ready format, the document may be suitable for rendering by one or more downstream components (e.g., rendering or display pipelines) with no additional transformations of e-commerce data values. In some embodiments, the rendering components may not alter or transform any e-commerce values in the render-ready document, e.g., any sums, aggregated values, or other numerical values calculated by the system in building the document. For the same e-commerce document generated in a render-ready or display-ready format, a value rendered using one rendering pipeline may not vary from the same value rendered using another rendering pipeline. If validation was not successful, then as shown in 270, the document framework system may not output the e-commerce document. Alternatively, the document framework system may output the e-commerce document with one or more indications of validation failure. For example, one or more values may be left blank if validation failed for those values.

Figure 3A:
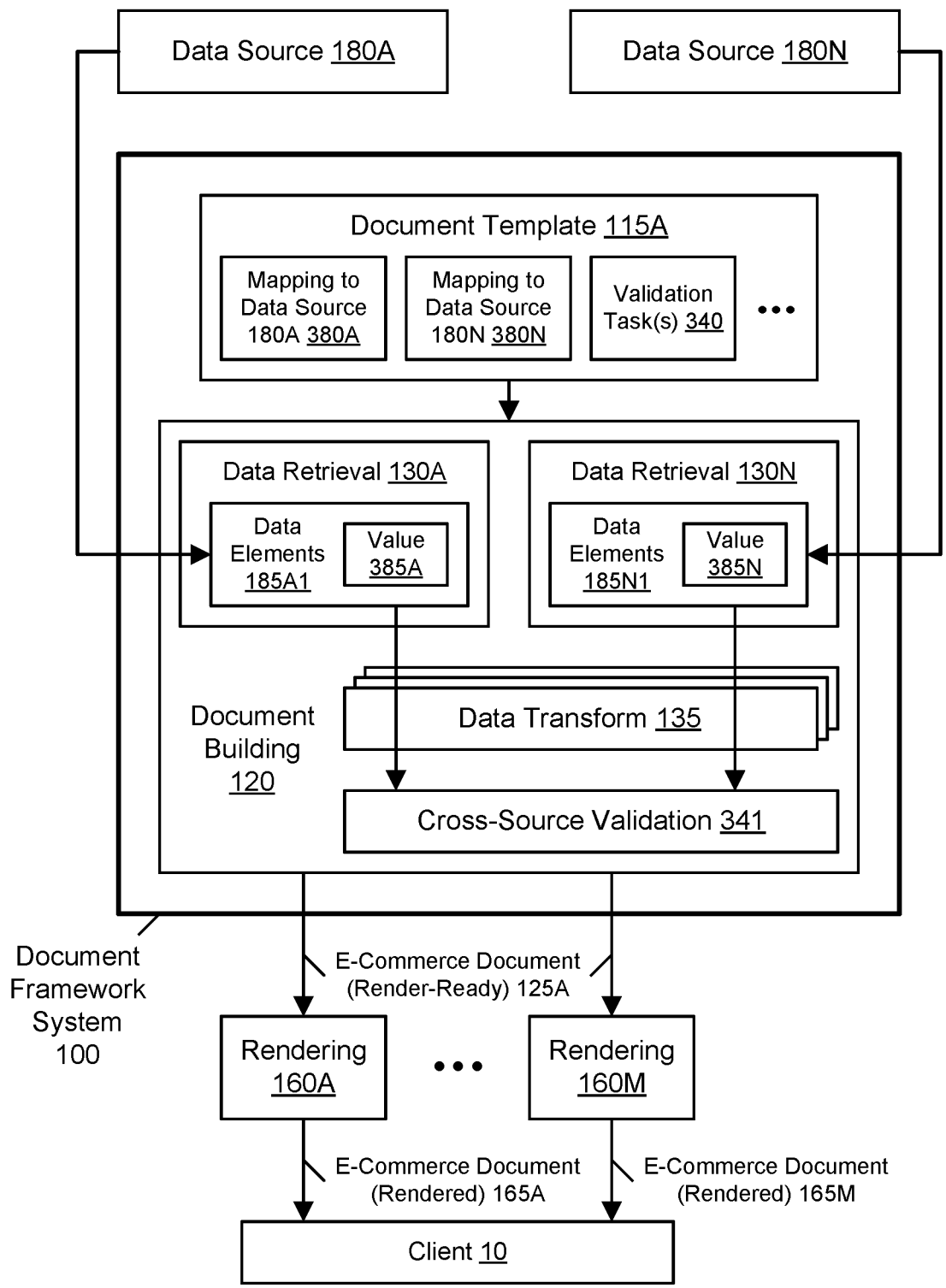
FIG. 3A illustrates further aspects of the example system environment for an e-commerce document framework with cross-source and cross-document validation, including cross-source validation for a document with values obtained from different data sources, according to some embodiments.
Figure 3B:
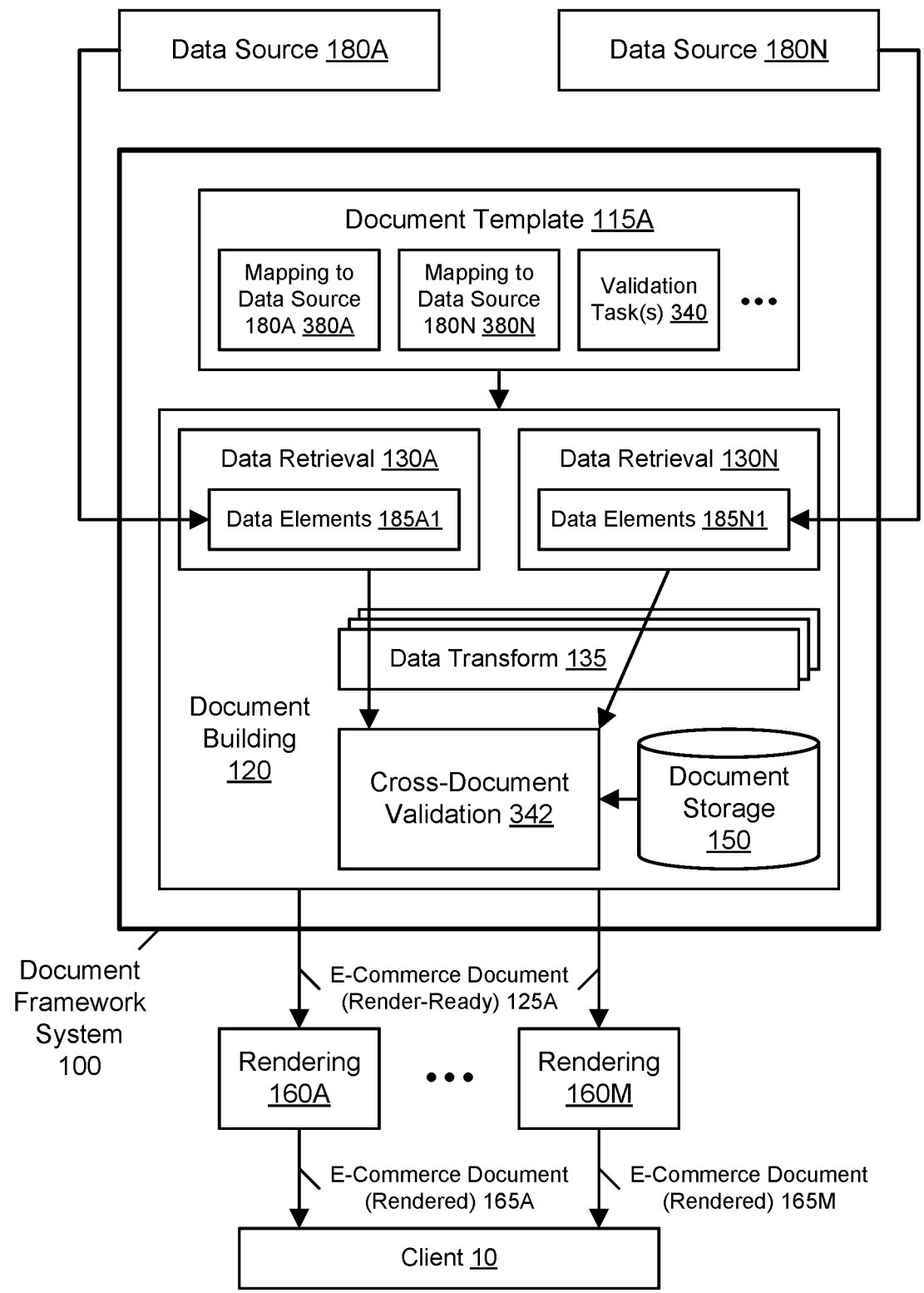
FIG. 3B illustrates further aspects of the example system environment for an e-commerce document framework with cross-source and cross-document validation, including cross-document validation, according to some embodiments.

FIG. 3A illustrates further aspects of the example system environment for an e-commerce document framework with cross-source and cross-document validation, including cross-source validation for a document with values obtained from different data sources, according to some embodiments. FIG. 3B illustrates further aspects of the example system environment for an e-commerce document framework with cross-source and cross-document validation, including cross-document validation, according to some embodiments. As discussed above, a document template 115A may include indications of particular data sources 180A-180N, e.g., via specified entities which are mapped to respective data authorities. For example, as shown in FIG. 3A and FIG. 3B, the template 115A may include one mapping 380A to one data source 180A and another mapping 380N to another data source 180N. The document template 115A may include indications of plug-ins to be used in building 120 an e-commerce document. For example, the template 115A may indicate one or more plug-ins to use for data retrieval 130, one or more plug-ins to use for data transformation 135, one or more plug-ins to use for validation 140 of data elements and/or documents, and so on. In some embodiments, some plug-ins may be specific to particular data sources and may be used independently of other plug-ins for other data sources. For example, a data retrieval plug-in for one data source 180A may differ from a data retrieval plug-in for another data source 180N, and the two plug-ins may be used independently of one another to acquire data from the corresponding data sources, e.g., as data retrieval 130A from data source 180A and data retrieval 130N from data source 180N.

As shown in FIG. 3A and FIG. 3B, the template 115A may specify validations via validation task(s) 340. Validation may be performed to ensure data completeness, integrity, accuracy, consistency, and so on. As shown in FIG. 3A, the document framework system 100 may perform cross-source validation 341. Cross-source validation 341 may ensure data consistency between or among different data authorities such as an ordering system, a tax system, a payment system, and so on. For example, the document building component 120 may begin building the e-commerce document 125A using data elements 185A1 derived from data source 180A and data elements 185N1 derived from data source 180N. The data elements 185A1 may include a value 385A, and the data elements 185A1 may include a corresponding value 385N. For example, the value 385A may represent a taxed value as maintained by an ordering system, and the value 385N may represent a taxed value as maintained by a tax system. The cross-source validation 341 may compare the value 385A to the value 385N and determine whether the values are consistent. In some embodiments, data sets from different data sources may be joined by common fields (e.g., keys), and the cross-source validation 341 may be performed for fields that are intended to match. The cross-source validation 341 may identify any mismatched data elements in such join operations.

As shown in FIG. 3B, the document framework system 100 may perform cross-document validation 342. Cross-document validation 342 may ensure that data in one document (e.g., document 125A) does not conflict with data in another document (e.g., an earlier-produced document stored in the document storage 150). For example, if the document framework system 100 issues multiple documents to the client referencing the same items, orders, or units, but the documents do not align on the exact same set of units, the cross-document validation 342 may ensure the accuracy of those values.

Figure 4:
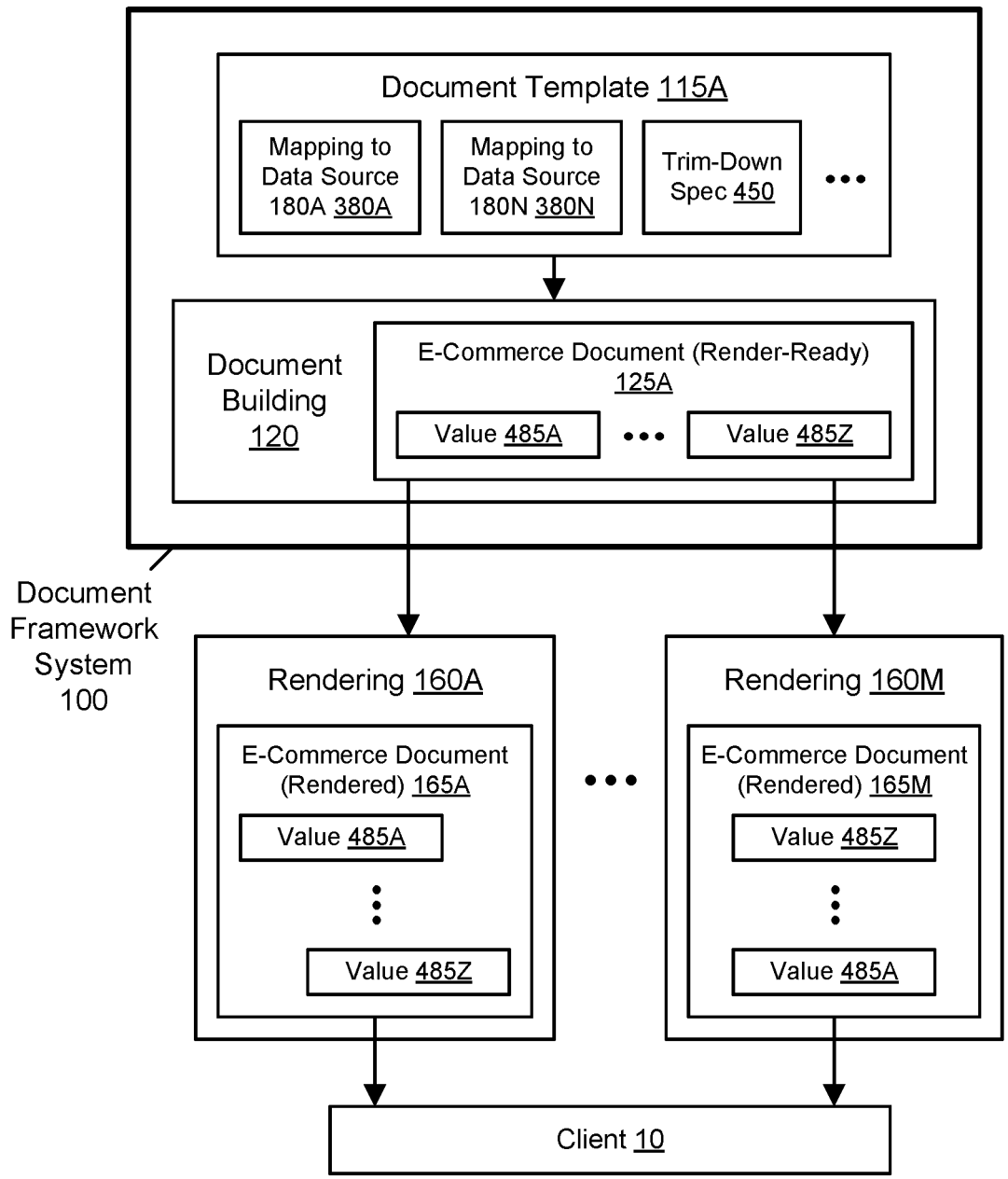
FIG. 4 illustrates further aspects of the example system environment for an e-commerce document framework with cross-source and cross-document validation, including an example of a "render-ready" document that is rendered using multiple rendering pipelines without performing additional transformations of values in the document, according to some embodiments.

FIG. 4 illustrates further aspects of the example system environment for an e-commerce document framework with cross-source and cross-document validation, including an example of a "render-ready" document that is rendered using multiple rendering pipelines without performing additional transformations of values in the document, according to some embodiments. As discussed above, the document framework system 100 may generate an invoice document 125A in a "render-ready" or "display-ready" format according to a document template 115A. In the render-ready or display-ready format, the document 125A may be transmitted to a client 10 by one or more downstream components such as rendering pipelines or display pipelines 160A-160N without performing recalculations of e-commerce data values 485A-485Z. For example, one rendering or display component 160A may generate a rendered or displayable version 165A of the render-ready document 125A, and another rendering or display component 160M may generate another rendered or displayable version 165M of the render-ready document 125A. In some embodiments, the rendering components 160A-160M may not alter any e-commerce values 485A-485Z in the render-ready document 125A, e.g., any sums, aggregated values, or other numerical values calculated by the system 100 in building the document 125A. For the same e-commerce document generated in a render-ready or display-ready format, a value 485A or 485Z rendered using one rendering pipeline 160A may not vary from the same value rendered using another rendering pipeline 160M. In some embodiments, the document building component 120 and/or rendering components 160A-160M may use a trim-down specification 450 of the template 115A to extract display-ready data values. In some embodiments, the rendering components 160A-160M may select some data values but not others from the render-ready document 125A. In some embodiments, as shown in FIG. 4, the rendering components 160A-160M may reorder data values from the render-ready document 125A. In some embodiments, the presentation order of some types of values (e.g., an order of payments) may not be changed. Documents 165A-165M may be rendered according to rendering templates that may differ from document type to document type.

A rendering template may define a layout or arrangement of values 485A-485Z in a rendered document.

Documents such as document 125A produced by the document framework system 100 may be used as authoritative display-ready data for each rendering pipeline 160A-160M to consume, render, and transmit to customers. For example, a cXML pipeline 160M may assemble the actual XML document using the render-ready e-commerce document, a VAT pipeline 160A may assemble the actual VAT PDF document, and so on. In some embodiments, the rendering process in each pipeline may not perform additional data manipulation or enrichment, such that the document framework system 100 need not inspect or re-validate values 485A-485Z in the rendered output. Documents may be rendered according to customer-specific preferences. As an example of how the document framework system 100 can use different rendering pipelines for the same data 485A-485Z, the system may generate invoice data payloads according to respective templates for one pipeline for the cXML invoice format and another pipeline for an invoicing payment method. If the customer selected purchase level consolidation that requires a "match" between various document types that the customer receives, the system 100 may account for that in assembling and validating the respective document payloads.

Figure 5:
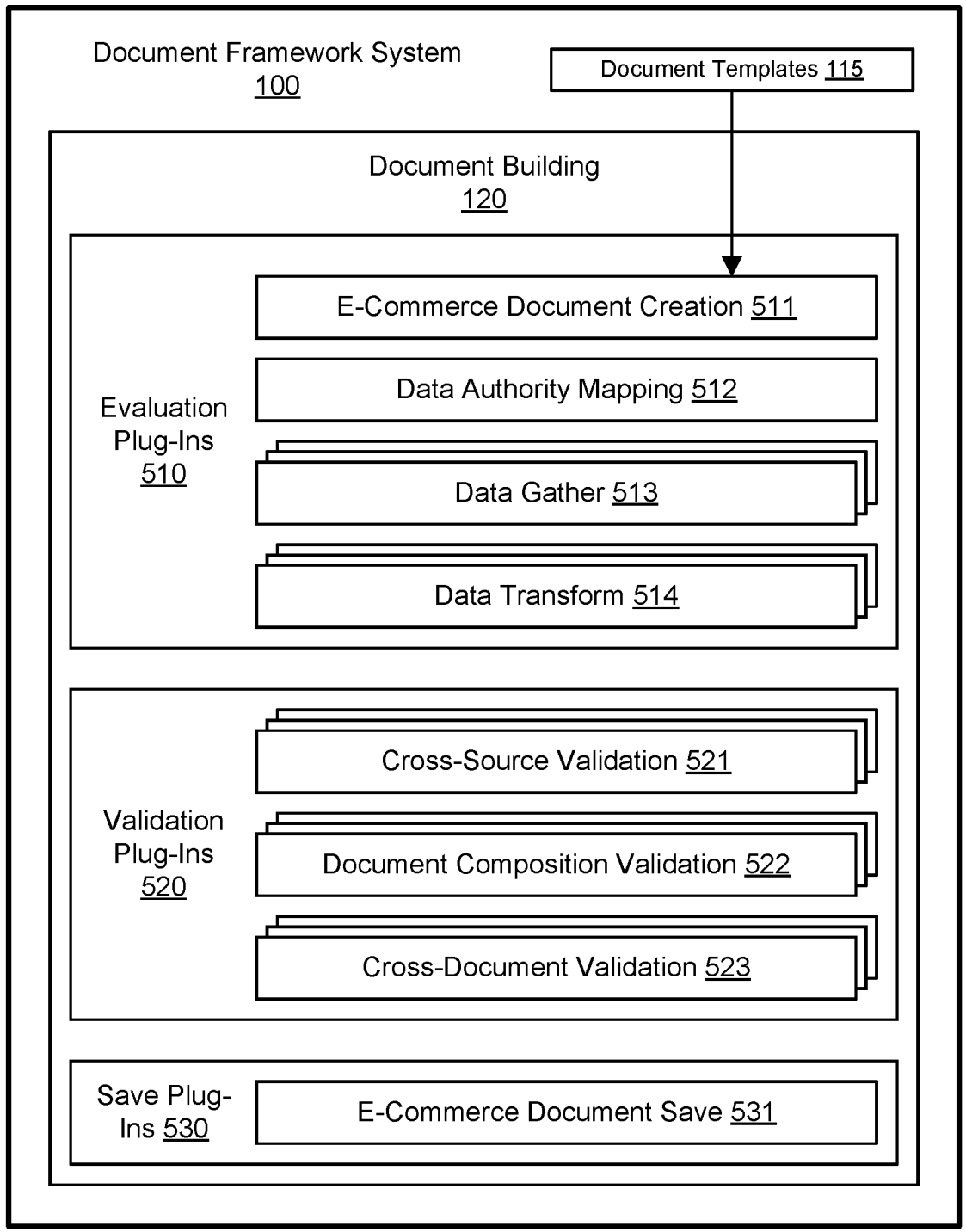
FIG. 5 illustrates further aspects of the example system environment for an e-commerce document framework with cross-source and cross-document validation, including a set of plug-ins used to generate and validate e-commerce documents, according to some embodiments.

FIG. 5 illustrates further aspects of the example system environment for an e-commerce document framework with cross-source and cross-document validation, including a set of plug-ins used to generate and validate e-commerce documents, according to some embodiments. To perform document assembly and data enrichment, the document framework system 100 may use a set of evaluation plug-ins 519. In some embodiments, some plug-ins may be specific to particular data sources and may be used independently of other plug-ins for other data sources. In some embodiments, the plug-ins may include a plug-in 511 to initiate creation an e-commerce document per one of the document templates 115. In some embodiments, the plug-ins may perform data authority mapping 512 to identify the data authority endpoints (e.g., data sources 180A-180N) that need to be invoked to gather document data. In some embodiments, the plug-ins may include one or more data gather plug-ins 613 that gather data from the data authority. In some embodiments, the plug-ins may include one or more data transform plug-ins 514 to convert the raw data from sources into one or more schemas per the document template. For example, one data transform plug-in for one data source may convert data elements from one source schema into a target schema, while another data transform plug-in for another data source may convert data elements from a different source schema into the target schema. The target schema may be indicated in the document template. Transformation from one schema to another may include reformatting data elements, e.g., by changing a data type or manner in which a data element is expressed. In some embodiments, clients (e.g., template owners) may add new plug-ins to add additional data enrichment and create schemas for the enrichment data. In some embodiments, different versions of an e-commerce document may be persisted in document storage 150 as the data gets modified through execution of the various plug-ins. In some embodiments, the plug-ins may include one or more save plug-ins 530 such as an e-commerce document save plug-in 531 that can persist versions of e-commerce documents to document storage 150.

In some embodiments, the plug-ins may include one or more validation plug-ins 520. For example, the validation plug-ins may include cross-source validation plug-in(s) 521 for data accuracy across multiple data sources, document composition validation plug-in(s) 522 for data completeness and integrity within the same document, cross-document validation plugin(s) 523 for data consistency across documents, and so on. Cross-source validation 521 may be performed for a particular document generated by the system 100. In some embodiments, the cross-source validation logic 521 may belong to the client (e.g., template owners), and the logic may be located inside the validation plug-ins that are owned by the client. In some embodiments, a validation plug-in may call one or more services that perform existing validation tasks external to the system 100. For any new validation required in new use cases, clients may create validation plug-ins 520 in the system 100 and define their validation logic on the invoice data. For example, a client may create a validation plug-in to verify the payment due amount in the remittance detail will match the amount in another data source. Document composition validation plug-in(s) 522 may ensure that all the components defined in the document template are present in the final display-ready document. Cross-document validation 523 may be performed for multiple documents generated by the system 100 (or known to the system), e.g., documents having an overlapping set of transactions with the current document. The cross-document validation logic 523 may be defined in the document template for both tax and non-tax invoices. For a common set of entities, the cross-document validation 523 may fetch multiple documents from the storage, perform the comparison, and generate errors (e.g., constraint violations) when mismatches are detected.

Figure 6:
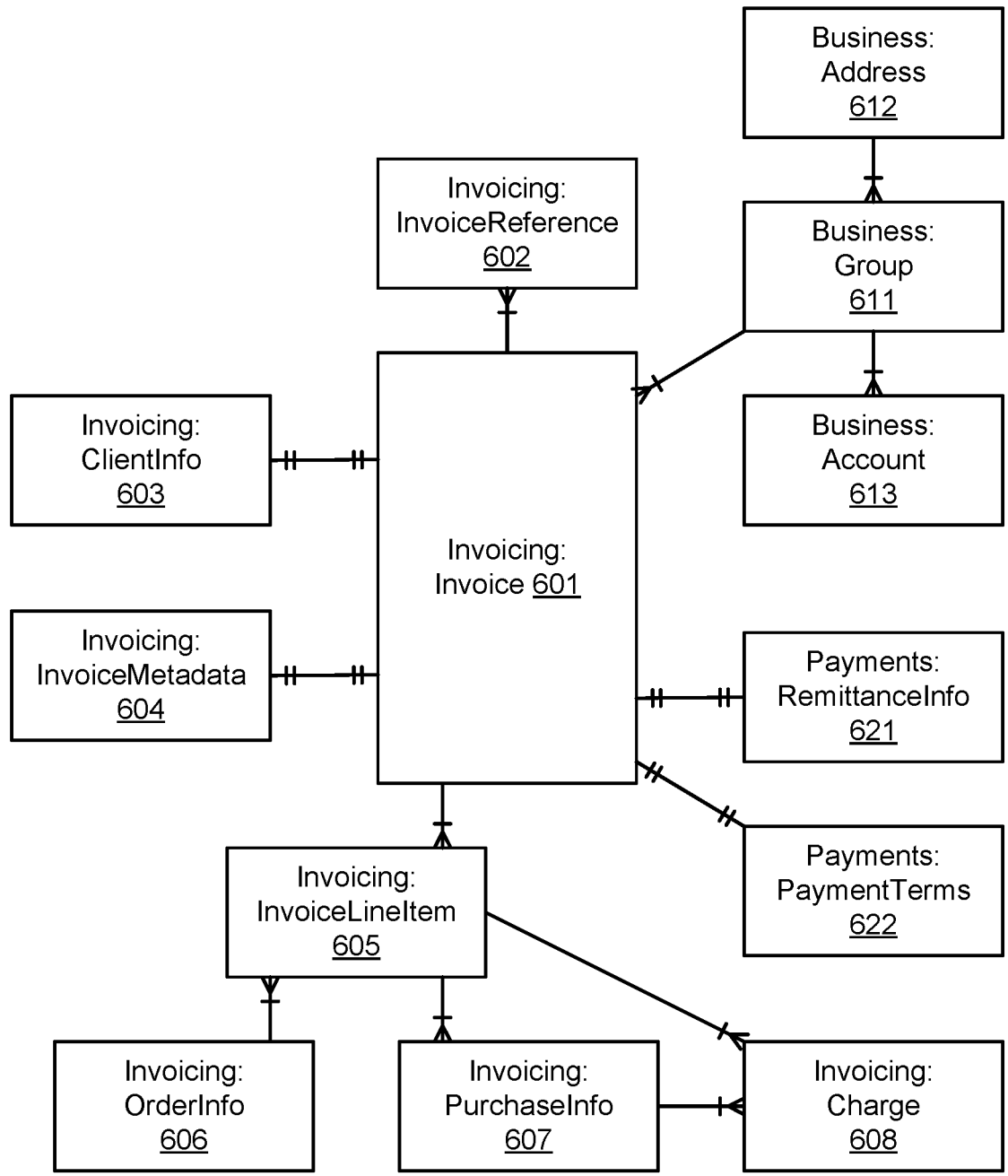
FIG. 6 illustrates further aspects of the example system environment for an e-commerce document framework with cross-source and cross-document validation, including a data model for an e-commerce document, according to some embodiments.

FIG. 6 illustrates further aspects of the example system environment for an e-commerce document framework with cross-source and cross-document validation, including a data model for an e-commerce document, according to some embodiments. The document framework system 100 may implement a federated data model. The document framework system 100 may use an underlying data model which is a federated entity-relationship data model to define ownership-driven entity definition and reference. The data model may define domain specific entities such as invoice configuration or remittance. Using the references between defined entities, the data model may be able to distinguish between data at different granularity levels (e.g., unit-level promotions vs. purchase-level promotions) as may be required to support various customer configurations. In some embodiments, an e-commerce document (e.g., an invoice document) may include one or more of the following elements: reference fields for invoice numbers, purchase order, time period, and so on; customer information such as a business address, bill-to address, VAT ID, and so on; line items such as descriptions, amount breakdowns, tax rates, and so on; summary information such as totals and adjustments; and payment information such as a payment method, currency, payment term, paid amount, due amount, remittance details, and so on.

In some embodiments, the document framework system 100 may use an invoice (or e-commerce) document model schema as shown in FIG. 6. The document model schema may define the entity-relationship constraints of e-commerce document data elements that govern the shape of the e-commerce document data payload. The data payload may also be validated against and filtered using the schema. The e-commerce document may represent the final display-ready data payload that complies with the e-commerce document model schema. The e-commerce document model schema may include entities associated with an invoicing system, such as an Invoice 601, one or more InvoiceReferences 602, ClientInfo 603, InvoiceMetadata 604, one or more InvoiceLineItems 605, OrderInfo 606, one or more PurchaseInfo entities 607 per InvoiceLineItem, and one or more Charge entities 608 per InvoiceLineItem 605 or PurchaseInfo 607. In some embodiments, an Invoice 601 may include elements such as a documentID, documentVersionID, invoiceID, invoiceTemplateID, invoiceTemplateVersionID, invoiceDate, invoiceType, and invoice Status.

An Invoice 601 may encapsulate the high-level information sufficient to uniquely identify an instance of an invoice. Every representation of the same invoice may have a unique documentID associated with it. An invoice may result in multiple invoice documents, e.g., the invoice may have different display-ready data representations if it is being rendered and transmitted as a VAT invoice and also as an e-Invoice based on the corresponding document template. The documentVersionID may allow for unique identification of each version of the document, thereby letting the document framework system 100 update an existing invoice document (e.g., via manual overrides or corrections) while maintaining the state of all versions. An invoiceID may appears as a unique identifier in the invoice artifact (e.g., invoice/credit memo) that is presented to the client 10. Even if there are multiple invoice documents for the same set of transactions (e.g., VAT Invoice, Payment Request, e-Invoice, and so on), each of them may have the same invoiceID. An invoiceTemplateID may be a unique identifier to indicate the template that has been used to generate the invoice document. Every template may have multiple versions as the invoice composition evolves with the business needs, and the invoiceTemplateVersionID may indicates the version of the template that was used to generate that instance of the Invoice Document. The invoiceDate may represent the issue date for the invoice artifact.

In some embodiments, an InvoiceReference 602 may include elements such as a referenceDocumentID, a referenceInvoiceID, and a referenceInvoiceDate. An Invoice entity 601 may have reference to one or more InvoiceReference entities 602, and each InvoiceReference entity may have the reduced set of the data to uniquely identify the related invoices. An InvoiceReference 602 may include a referenceDocumentID that represents a unique identifier of the referenced Invoice document instance. An InvoiceReference 602 may include a referenceInvoiceID representing the invoiceID for the referenced Invoice document.

In some embodiments, a ClientInfo 603 may include elements such as a clientID, a clientName, a clientBusinessReferenceID, a clientNotificationID, and a clientNotificationType. ClientInfo 603 may encapsulates the data to uniquely identify the client and the client's request in the corresponding business domain. The clientID may include the unique identifier of the client, and the clientName may include the name of the client. The clientBusinessReferenceID may include a unique identifier for the client's request. In some embodiments, a combination of the clientID and clientBusinessReferenceID may be unique.

In some embodiments, an InvoiceMetadata 604 may include elements such as an invoiceGroupingIdentifier, an invoiceGroupingIdentifierType, an invoiceSpanStartDate, an invoiceSpanEndDate, and a renderedArtifactID. In some embodiments, an InvoiceLineItem 605 may include elements such as a unitRange, a lineItemID, an orderingContractID, and an orderingContractType. An InvoiceLineItem 605 may represent a set of units that are identical to each other and which can be represented as a standalone line item in an invoice. Every InvoiceLineItem 605 may reference to a set of charges, e.g., OurPrice, Shipping, Export Fee, Promotions, and so on. One or more Charge entities 608 can be associated with every InvoiceLineItem 605. An Invoice 601 may include a set of InvoiceLineItem entities 605, and the size of the set may depend on the number of unique group of entities. An InvoiceLineItem 605 may act as root entity of the Invoice Document. Because an InvoiceLineItem 605 may correspond to a group of units which are similar, the unitRange may indicate the list of unit IDs which are part of a unit group. A shipment lineItemID may include the identifier of the corresponding line item in the context of the shipment it belongs to. An ordering lineItemID may correspond to the units part of the LineItem. A single lineItemID may correspond to a Unit Group, because units corresponding to different line items may differ. An orderingContractID may include an orderID (for an Invoice) or a reversalID (for a credit memo). An orderingContractIDType may indicate the type of contract, e.g., a purchase or reversal. In some embodiments, an OrderInfo 606 may include elements such as an orderID, a POorder string, an orderedBy string, and additional data. In some embodiments, a PurchaseInfo 607 may include elements such as a purchaseID. In some embodiments, a Charge 608 may include elements such as a chargeID, chargeType, amount, and metadata. Every InvoiceLineItem 605 may have a list of Charges 608 associated with it. A Charge entity 608 may correspond to one of the following types: OurPrice, Shipping, Giftwrap, Export Fee, Tax, Discount, and so on. For credit memos, there may be additional charge types such as Return Shipping Fee, Restocking Fee, GoodWill, and so on.

The e-commerce document model schema may include entities associated with a business record system, such a Group 611, Address 612, and one or more Accounts 613 per Group. In some embodiments, a Group 611 may include elements such as a groupID and a businessName. In some embodiments, an Address 612 may include elements such as a shipToAddressID and a billToAddressID. In some embodiments, an Account 613 may include elements such as an accountID and an accountName. The e-commerce document model schema may include entities associated with a payments system, such as RemittanceInfo 621 and PaymentTerms 622. In some embodiments, a RemittanceInfo 621 may include elements such as BankDetails and CheckPayment. In some embodiments, a PaymentTerms 622 may include elements such as a payTerm, a payDueAmount, and a payDueDate.

Illustrative Computer System

In at least some embodiments, a computer system that implements a portion or all of one or more of the technologies described herein may include a computer system that includes or is configured to access one or more computer-readable media. FIG. 7 illustrates such a computing device 700 according to one embodiment. In the illustrated embodiment, computing device 700 includes one or more processors 710A-710N coupled to a system memory 720 via an input/output (I/O) interface 730. In one embodiment, computing device 700 further includes a network interface 740 coupled to I/O interface 730.

In various embodiments, computing device 700 may be a uniprocessor system including one processor or a multiprocessor system including several processors 710A-710N (e.g., two, four, eight, or another suitable number). In one embodiment, processors 710A-710N may include any suitable processors capable of executing instructions. For example, in various embodiments, processors 710A-710N may be processors implementing any of a variety of instruction set architectures (ISAs), such as the x86, PowerPC, SPARC, or MIPS ISAs, or any other suitable ISA. In one embodiment, in multiprocessor systems, each of processors 710A-710N may commonly, but not necessarily, implement the same ISA.

In one embodiment, system memory 720 may be configured to store program instructions and data accessible by processor(s) 710A-710N. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 720, e.g., as code (i.e., program instructions) 725 and data 726. In the illustrated embodiment, program code implementing aspects of the document framework system 100 may be stored in system memory 720.

In one embodiment, I/O interface 730 may be configured to coordinate I/O traffic between processors 710A-710N, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processors 710A-710N). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In some embodiments, some or all of the functionality of I/O interface 730, such as an interface to system memory 720, may be incorporated directly into processors 710A-710N.

In one embodiment, network interface 740 may be configured to allow data to be exchanged between computing device 700 and other devices 760 attached to a network or networks 750. In various embodiments, network interface 740 may support communication via any suitable wired or wireless general data networks, such as types of Ethernet network, for example. Additionally, in some embodiments, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 700 via I/O interface 730. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 700 as system memory 720 or another type of memory. In one embodiment, a computer-readable medium may include transmission media or signals such as electrical, electromagnetic, or digital signals, conveyed via a communication medium such as a network and/or a wireless link, such as may be implemented via network interface 740. The described functionality may be implemented using one or more non-transitory computer-readable storage media storing program instructions that are executed on or across one or more processors. Portions or all of multiple computing devices such as that illustrated in FIG. 7 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a document framework system comprising one or more processors and one or more memories to store computer-executable instructions that, when executed, cause the one or more processors to:
receive a request to generate an e-commerce document comprising a record of one or more e-commerce transactions;
retrieve a document template associated with the request and distinct from the e-commerce document to be generated in accordance with the document template, wherein the document template indicates a plurality of data sources that store a plurality of data elements for building the e-commerce document, wherein the document template indicates one or more data transform tasks, and wherein the document template indicates a plurality of validation tasks for the e-commerce document;
retrieve, based at least in part on the indication of the plurality of data sources in the document template, the plurality of data elements for building the e-commerce document from the plurality of data sources;
perform, based at least in part on the indication of the one or more data transform tasks in the document template, the one or more data transform tasks for one or more of the plurality of data elements for the e-commerce document to produce one or more transformed data elements;
perform, based at least in part on the indication of the plurality of validation tasks in the document template, the validation tasks for the e-commerce document, wherein the validation tasks determine a correctness of at least a portion of the transformed data elements for building the e-commerce document, wherein the validation tasks comprise cross-source validation for two or more of the data sources, and wherein the validation tasks comprise cross-document validation between the e-commerce document and one or more additional documents; and
if the validation is successful, generate the e-commerce document that is distinct from the document template, wherein said generate the e-commerce document comprises build the e-commerce document using the plurality of data elements from the different data sources comprising at least one or more of the transformed data elements, wherein the e-commerce document comprises one or more e-commerce values associated with the one or more transactions in a render-ready format, and wherein the e-commerce document is rendered for display using one or more rendering components.

2. The system as recited in claim 1, wherein the e-commerce document is rendered for display using the one or more rendering components without recalculating the one or more e-commerce values associated with the one or more transactions.

3. The system as recited in claim 1, wherein the e-commerce document is generated using a plurality of plug-ins, wherein an individual one of the plug-ins corresponds to an individual one of the data sources.

4. The system as recited in claim 1, wherein the one or more memories store additional computer-executable instructions that, when executed, cause the one or more processors to:
if one or more of the validation tasks is unsuccessful, generate the e-commerce document comprising one or more indications of failed validation; or
if one or more of the validation tasks is unsuccessful, return an error without generating the e-commerce document.

5. A method, comprising:
determining, by a document framework system, a document template associated with a request to generate a document distinct from the document template, the document comprising a record of one or more transactions, and the document to be generated in accordance with the document template, wherein the document template indicates a plurality of data sources that store a plurality of data elements for building the document, and wherein the document template indicates one or more transform tasks, and a plurality of validation tasks for the document;
receiving, by the document framework system and based at least in part on the indication of the plurality of data sources in the document template, the plurality of data elements for building the document from the plurality of data sources;
performing, based at least in part on the indication of the one or more data transform tasks in the document template, the one or more data transform tasks for one or more of the plurality of data elements for the document to produce one or more transformed data elements;
performing, by the document framework system and based at least in part on the indication of the plurality of validation tasks in the document template, the validation tasks for the document, wherein the validation tasks determine a correctness of at least a portion of the transformed data elements for building the document, wherein the validation tasks comprise cross-source validation for two or more of the data sources, and wherein the validation tasks comprise cross-document validation between the document and one or more additional documents; and
generating, by the document framework system, the document that is distinct from the document template, wherein said generating comprises building the document using the plurality of data elements, comprising at least one or more of the transformed data elements, from the different data sources, and wherein the document comprises one or more values in a render-ready format.

6. The method as recited in claim 5, wherein the document comprises one or more values associated with the one or more transactions in a render-ready format, and wherein the document is rendered for display using one or more output components without recalculating the one or more values associated with the one or more transactions.

7. The method as recited in claim 5, wherein the data elements are received using a plurality of plug-ins, wherein an individual one of the plug-ins corresponds to an individual one of the data sources.

8. The method as recited in claim 5, further comprising:
if one or more of the validation tasks is unsuccessful, generating the document comprising one or more indications of failed validation; or
if one or more of the validation tasks is unsuccessful, returning an error without generating the document.

9. The method as recited in claim 5, wherein the document template indicates one or more data transform tasks, and wherein the method further comprises:
performing, by the document framework system, the one or more data transform tasks using at least some of the plurality of data elements, wherein the one or more data transform tasks are performed without retrieving additional data elements from the plurality of data sources.

10. The method as recited in claim 9, wherein the one or more data transform tasks are performed using a plurality of plug-ins, wherein an individual one of the plug-ins corresponds to an individual one of the data sources.

11. The method as recited in claim 5, further comprising:
storing, by the document framework system, one or more versions of the document using one or more persistent storage resources; and
performing, by the document framework system, one or more auditing or tracing operations based at least in part on the one or more versions of the document retrieved from the one or more persistent storage resources.

12. The method as recited in claim 5, wherein a first version of the document is rendered for display according to a first rendering template using a first rendering component, wherein a second version of the document is rendered for display according to a second rendering template using a second rendering component, and wherein one or more calculated values in the first version of the document are the same as one or more corresponding calculated values in the second version of the document.

13. One or more non-transitory computer-readable storage media storing program instructions that, when executed on or across one or more processors, perform:
determining, by a document framework system, a document template associated with a request to generate an invoice document distinct from the document template, the invoice document representing a record of one or more transactions, and the document to be generated in accordance with the documents template, wherein the document template indicates a plurality of data sources that store a plurality of data elements for building the invoice document, and wherein the document template indicates one or more data transform tasks, and a plurality of validation tasks;
retrieving, by the document framework system and based at least in part on the indication of the plurality of data sources in the document template, the plurality of data elements for building the invoice document from the plurality of data sources;
performing, based at least in part on the indication of the one or more data transform tasks in the document template, the one or more data transform tasks for one or more of the plurality of data elements for the invoice document to produce one or more transformed data elements;
performing, by the document framework system and based at least in part on the indication of the plurality of validation tasks in the document template, the validation tasks for the invoice document, wherein the validation tasks determine a correctness of at least a portion of the transformed data elements for building the invoice document, wherein the validation tasks comprise cross-source validation for two or more of the data sources, and wherein the validation tasks comprise cross-document validation between the invoice document and one or more additional documents; and
generating, by the document framework system, the invoice document that is distinct from the document template, wherein said generating comprises building the invoice document using the plurality of data elements from the data sources comprising at least one or more of the transformed data elements, wherein the invoice document comprises one or more numerical values associated with the one or more transactions in a display-ready format, and wherein the invoice document is rendered for display using one or more rendering components.

14. The one or more non-transitory computer-readable storage media as recited in claim 13, wherein the invoice document is rendered for display using the one or more rendering components without recalculating the one or more numerical values associated with the one or more transactions.

15. The one or more non-transitory computer-readable storage media as recited in claim 13, wherein the data elements are retrieved using a plurality of plug-ins, wherein an individual one of the plug-ins corresponds to an individual one of the data sources.

16. The one or more non-transitory computer-readable storage media as recited in claim 13, further comprising additional program instructions that, when executed on or across the one or more processors, perform:
if one or more of the validation tasks is unsuccessful, generating the invoice document comprising one or more indications of validation failure; or
if one or more of the validation tasks is unsuccessful, returning an error without generating the invoice document.

17. The one or more non-transitory computer-readable storage media as recited in claim 13, further comprising additional program instructions that, when executed on or across the one or more processors, perform:
performing, by the document framework system, one or more data transform tasks using at least some of the plurality of data elements, wherein the document template indicates the one or more data transform tasks, and wherein the one or more data transform tasks are performed without retrieving additional data elements from the plurality of data sources.

18. The one or more non-transitory computer-readable storage media as recited in claim 13, further comprising additional program instructions that, when executed on or across the one or more processors, perform:
storing, by the document framework system, a plurality of versions of the invoice document using one or more persistent storage resources; and
performing, by the document framework system, one or more auditing or tracing operations based at least in part on the plurality of versions of the invoice document retrieved from the one or more persistent storage resources.

19. The one or more non-transitory computer-readable storage media as recited in claim 13, wherein the document template comprises a trim-down specification, wherein one or more display-ready values are extracted for the invoice document based at least in part on the trim-down specification.

20. The one or more non-transitory computer-readable storage media as recited in claim 13, wherein the invoice document is generated using a plurality of plug-ins, wherein the plug-ins identify the plurality of data sources, retrieve the plurality of data elements from the plurality of data sources, and transform the data elements according to the document template.

\* \* \* \* \*